May 29, 1923.
C. S. WILLIAMS
MOTOR CYCLE ATTACHMENT
Filed Oct. 31, 1921
1,457,241
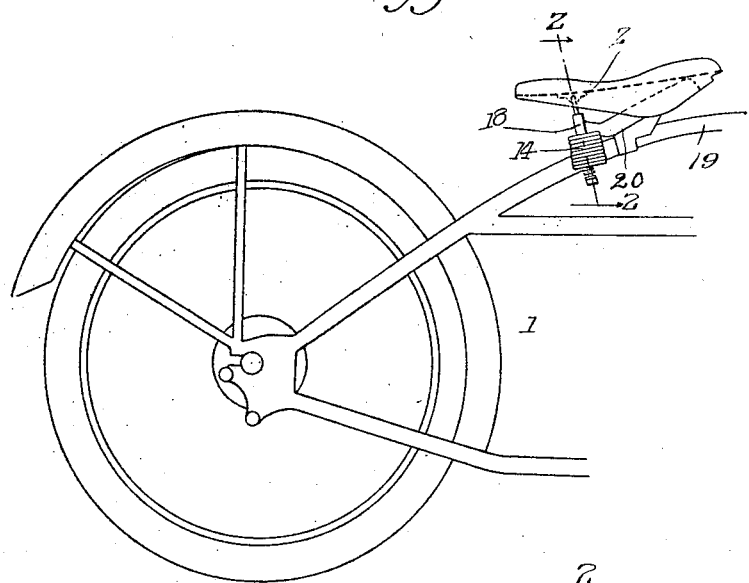
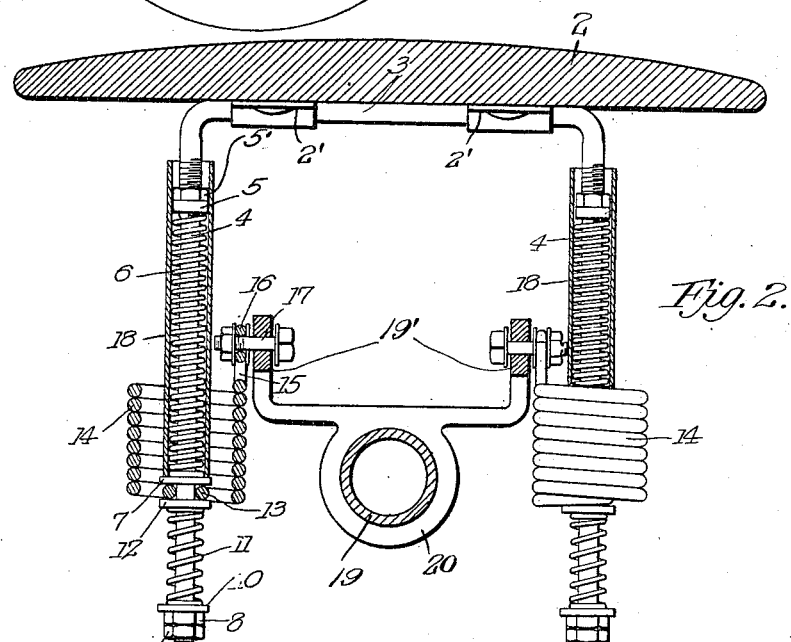
C. S. Williams
INVENTOR
BY Victor J. Evans
ATTORNEY
WITNESS:

Patented May 29, 1923.

1,457,241

UNITED STATES PATENT OFFICE.

CHARLES S. WILLIAMS, OF NORTH BILLERICA, MASSACHUSETTS, ASSIGNOR TO CHARLES A. PERSONS, OF WORCESTER, MASSACHUSETTS.

MOTOR-CYCLE ATTACHMENT.

Application filed October 31, 1921. Serial No. 511,716.

*To all whom it may concern:*

Be it known that I, CHARLES S. WILLIAMS, a citizen of the United States, residing at North Billerica, in the county of Middlesex and State of Massachusetts, have invented new and useful Improvements in Motor-Cycle Attachments, of which the following is a specification.

In the ordinary construction of motorcycles the saddle is supported on two heavy springs that are attached to the frame of the machine. These springs do not possess sufficient yieldability to render the riding on the machine comfortable to the operator when the machine travels over rough roads, and it is the object of this invention to produce a seat or saddle support for motorcylces which shall be as strong and effective as those in common use but which will possess a desired yieldability to insure the comfort of the rider of the machine.

A further object is to produce a saddle mount or support for motorcycles which includes a member attached to the under face of the saddle and provided with spaced depending arms, each of said arms having upper comparatively light road shock absorbing springs arranged therearound which contact with adjustable means at the top of the arms and with a washer adjacent to the lower ends of the arms, a second washer being disposed adjacent to the last mentioned washer and being arranged for contact by the end convolution of a second comparatively light rebound spring which also surrounds the arms, said rebound springs being supported on adjustable means on the lower end of the arms, while secured to the washers and surrounding the arms are comparatively heavy springs which have their opposite ends attached to the frame of the machine, and whereby light shocks will be taken up and absorbed by the upper light springs, heavier shocks being absorbed by the said light springs and by the heavy springs, and the rebound from said shocks being taken up by the rebound springs.

The drawings illustrate a satisfactory embodiment of the improvement reduced to practice, and wherein:—

Figure 1 is a side elevation of a motorcycle provided with the improvement.

Figure 2 is a sectional view on the line 2—2 of Figure 1, looking in the direction of the arrows.

A portion of a motorcycle is illustrated by the drawings and is indicated by the numeral 1. The seat or saddle for the machine is indicated by the numeral 2, and in the present instance, the same has secured by means 2′ upon its under face the connecting element 3 for the parallel arms 4 of a substantially inverted U-shaped member or yoke.

The upper ends of the arms 4 are threaded and have freely slidable thereon washers 5. Screwed on the said upper ends and in contact with the outer faces of the washers 5 are nuts 5′. Around the said arms and in contacting engagement with the said washers are comparatively light helical springs 6. These springs have their lower ends resting on washers 7 that are slidably arranged on the arms 4. The springs 6 are held in contacting engagement with the washers 7 and 5 in a manner which will presently be apparent. The lower threaded ends of the arms have screwed thereon a nut 8 which is engaged by a lock nut 9, and on the arm and resting on the upper nut 8 there is a washer 10. Surrounding the arms and resting on the washers 10 are helical springs 11 of a lighter or weaker construction than the helical springs 6. The upper convolutions of the springs 11 are in contacting engagement with washers 12. The springs 6, washers 5 and nuts 5′ are surrounded by sleeves 18, which rest on the washers 7.

Between the washers 7 and 12 there are arranged on the arms 4 the eye ends 13 of comparatively heavy helical springs 14. The outer convolutions of the springs 14 are provided with extensions in the nature of arms 15 provided with eyes 16 through which pass securing means 17 that attach the same to the upstanding arm 19′ of a bracket 20 which is welded or otherwise secured to the top bar 19 of the frame of the motorcycle 1.

The springs 6 are in the nature of absorbing elements for light road shocks, the springs 14 are designed to absorb violent shocks, and the springs 11 are in the nature of rebound springs for absorbing the rebound of the arms. A slight downward pressure on the seat 2 against the member 3 will cause the arms thereof to move downwardly through the washers 7 and 12 without materially expanding the springs 14, and it will be thus noted that such light shocks are absorbed by the springs 6. The rebound is taken care of by the rebound springs 11. A violent shock will cause the springs 6 to be compressed between the washers 5 and 7, and the said washers 7 bearing upon the eyes 13 of the springs 14 will expand the said springs so that the improvement provides for both light and violent shocks. The rebound is at all times taken up by the rebound springs 11. The sleeves 18 protect the springs 6, washers 5 and nuts 5', and also prevent undue lateral expansion of the springs 6.

Having described the invention, I claim:—

1. The combination with a motorcycle, of a seat support therefor, comprising members secured to the seat, depending therefrom and straddling the top bar of the machine, a shock absorbing spring and a rebound spring adjustably sustained on said members, and a supporting spring surrounding each of said members having its upper convolution secured to the machine frame and having its lower convolution extended inwardly and formed with eyes arranged for slidable movement on the respective members between the shock absorbing and rebound springs.

2. The combination with a motorcycle, of a seat support therefor, comprising a yoke member which is centrally secured to the seat and which has its parallel arms straddling the top bar of the frame of the machine, a shock absorbing spring and a rebound spring on the arms of the yoke, means contacting the outer ends of said springs for adjusting the same, a heavier and a shorter spring surrounding the arms of the yoke having its upper convolution secured to the frame of the machine, its lower convolution extended inwardly and formed with an eye that receives therethrough the arms of the yoke, and slidable contact members on the arms of the yoke between the eyes of the last mentioned spring and the confronting ends of the first mentioned springs.

3. The combination with a motorcycle, of a seat support therefor, comprising a substantially U-shaped yoke having its central portion secured to the seat and the arms thereof straddling the top of the frame of the machine, said arms being threaded at their opposite ends, nut members screwed on said threaded portions, washers in contact with said nuts, a comparatively long shock absorbing spring on each arm in contact with the upper washer thereon, a comparatively short light rebound spring on each of said arms in contact with the lower washer thereon, other washers slidable on the arms in contact with the confronting ends of the mentioned springs, a comparatively stout helical spring surrounding the arms having the upper ends thereof secured to the frame of the machine and their lower convolutions bent inwardly and formed with eyes receiving the arms of the yoke between the last mentioned washers.

4. The combination with a motorcycle, of a shock absorbing support for the seat thereof, comprising an inverted U-shaped yoke whose central portion is secured to the seat and whose parallel arms straddle the upper bar of the frame of the machine, the arms of the yoke being threaded at the ends thereof, nuts screwed on said threaded portions, upper and lower washers on the arms in contacting engagement with the confronting faces of the nuts, a comparatively long shock absorbing spring on each arm in contact with the upper washer thereon, a comparatively short rebound spring on each arm in contact with the lower washers on each of said arms, washers on the arms in contact with the confronting ends of the springs thereon, a comparatively short helical spring surrounding each arm having its upper convolution extended and secured to the top bar of the machine, each of said last mentioned springs having its lower convolution extended inwardly and formed with an eye to receive the arm of the yoke therethrough, said eyes being arranged between the last mentioned washers, and a sleeve on each arm surrounding the shock absorbing spring and resting on the upper last mentioned washer.

In testimony whereof I affix my signature.

CHARLES S. WILLIAMS.